Figure 1:
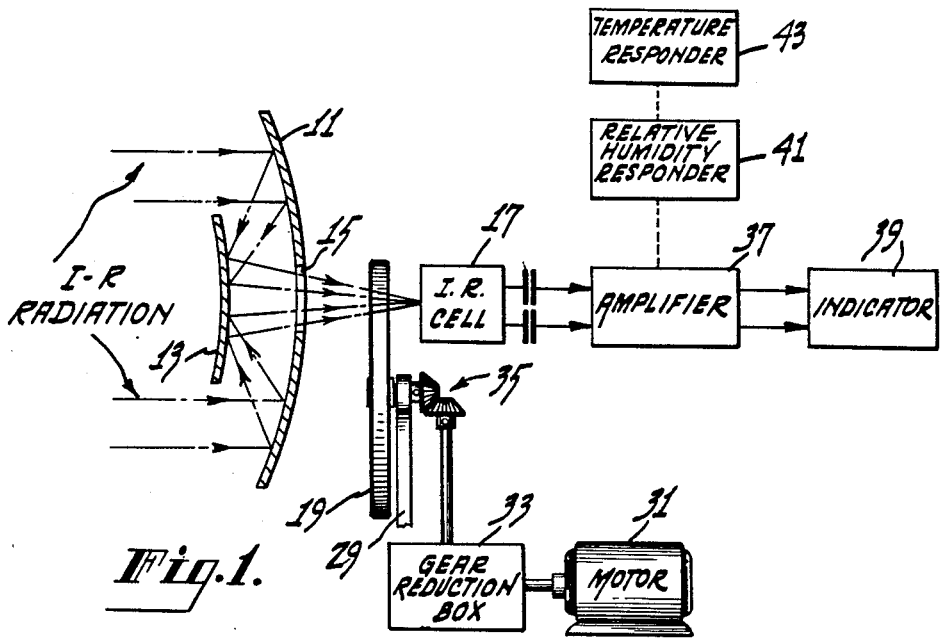

March 20, 1962 P. K. TAYLOR 3,026,413
DETERMINING THE RANGE OF AN INFRA-RED
SOURCE WITH RESPECT TO A POINT
Filed Nov. 1, 1952

INVENTOR.
PAUL K. TAYLOR

BY
ATTORNEY

United States Patent Office 3,026,413
Patented Mar. 20, 1962

3,026,413
DETERMINING THE RANGE OF AN INFRA-RED SOURCE WITH RESPECT TO A POINT
Paul K. Taylor, Haddon Heights, N.J., assignor to Radio Corporation of America, a corporation of Delaware
Filed Nov. 1, 1952, Ser. No. 318,174
11 Claims. (Cl. 250—83.3)

This invention relates generally to infra-red systems and particularly to improved methods of and means for determining the range of an infra-red source with respect to a reference point.

Some presently known infra-red object locating systems primarily are utilized to provide information that a thermal radiation source does exist and to indicate the direction of the source relative to a reference point. A disadvantage of these systems is that they do not inherently afford information relating to the range of the source. In the event that such additional data is desired it may be necessary to locate object detecting equipment at several spaced reference points. The source position then may be "fixed" by triangulation or other means. Source position determination by such methods and means, however, is complicated since detector equipment must be duplicated at each reference point, trained personnel are required to operate and service the equipment at each location, and communications must be established therebetween for exchanging information prerequisite to making the positional fix. Moreover, such a system is not readily adaptable for wide use. For example, a system of the type described above clearly is not satisfactory for airborne use since a single craft could not independently determine the range of a thermal source.

In accordance with the method of the invention radiant energy signals having a wide range of wavelengths are radiated by the infra-red source. A pair of different wavelength bands of such radiant energy signals selectively are received at the reference point. One of the energy bands is selected to lie within an "atmospheric window" in which there is no appreciable atmospheric absorption of the source radiation during the time in which the radiation traverses the distance between the source and the reference point. The remaining energy band is chosen to lie in a portion of the infra-red frequency spectrum wherein that portion of the source radiations partially are absorbed either by atmospheric water, vapor, carbon dioxide, or ozone. Assuming that the absorption band of the second energy band is chosen to be a band in which infra-red radiations are absorbed by water vapor, the amount of radiation absorbed is directly dependent on the amount of water vapor intermediate the source and the reference point and hence to distance. By effectively comparing the relative quantities of energy thus selectively received, a signal may be derived therefrom having an amplitude which is directly proportional to the differential absorption of the different signal bands and thus to the range of the source with respect to the reference point.

An object of the invention is to provide improved methods and means for determining the range of an infra-red source with respect to a reference point.

Another object of the invention is to utilize atmospheric absorption of radiant energy emitted by an infra-red source to determine the range of said source relative to a reference point.

A further object is to determine the range of an infra-red source with respect to a point by effectively comparing the relative atmospheric absorption of different wavelength bands of signals radiated by said source.

A further object of the invention is to determine the range of an infra-red source with respect to a point by effectively comparing, at said point, the level of received energy radiated by said source and propagated through an atmospheric window to said point with the level of received source energy wholly or partially subject to atmospheric absorption.

A still further object of the invention is to provide an infra-red ranging system adapted for airborne use.

Figure 2:
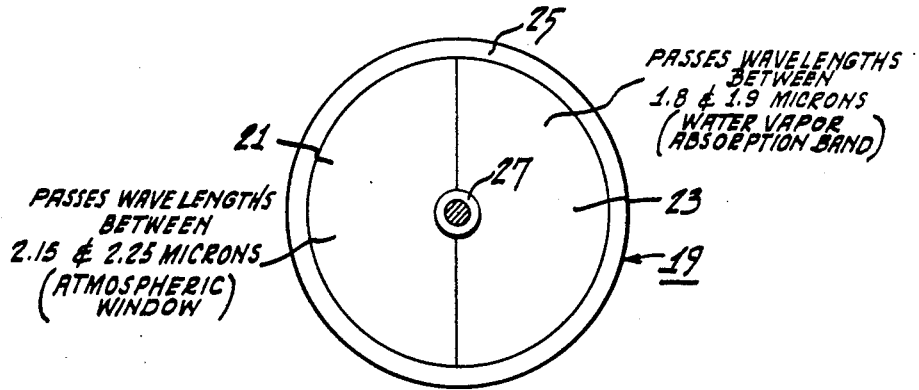

The invention will be described in detail with reference to the accompanying drawing in which:

FIGURE 1 is a schematic diagram, partially in block form, of an infra-red ranging system, according to the invention; and FIGURE 2 is a plan view of a filter arrangement utilized in the ranging system of FIGURE 1 and illustrating the relative disposition of different filter units employed.

Similar reference characters are applied to similar elements throughout the drawing.

Referring to FIGURES 1 and 2, signals having a wide range of frequencies are radiated by an infra-red source (not shown) which is spaced from a reference point by some distance to be determined. The relatively wide band source radiation which arrives at the reference point is collected by a spherical mirror 11 and is reflected toward a second curve mirror 13 which, in turn, directs the energy incident thereon through an aperture 15 in the first mirror 11. The design of the optical system is such that the energy directed through the aperture 15 is brought to a focus at the surface of an infra-red sensitive cell 17, for example, a lead sulfide cell. The sensitivity of the cell 17 preferably is increased by suitably cooling the cell with Dry Ice or some other coolant. Disposed intermediate the mirror 11 and the cell 17 is a filter disk 19. The filter disk 19, shown in FIGURE 2, comprises a pair of narrow band band-pass filters 21 and 23 supported adjacent each other by mounting rings 25 an 27. Preferably the filters are of the type described in an article by H. D. Polster appearing in the Journal of the Optical Society of America and entitled "A Symmetrical All-Dielectric Interference Filter," volume 42, number 1, pages 21–24 (1952).

The beam of radiation passing through aperture 15 of mirror 11 and directed toward IR cell 17 is either sufficiently aparallel to insure proper filtering action of filter disk 19, or is rendered parallel where it passes through said disk and yet convergent on to IR cell 17 by the interposition of a suitable devergent lens intermediate mirror 15 and filter disk 19 and a suitable convergent lens intermediate filter disk 19 and IR cell 17.

One of the filters 21 is chosen to admit infra-red energy to the cell 17 which energy lies within an atmospheric window. For the present example the pass band of the filter 21 is chosen to coincide with a portion 2.15 to 2.25 microns of an atmospheric window extending from 2.10 to 2.35 microns. The source energy thus passed by the filter 21 is subject to reduction in intensity attributable only to the operation of the inverse square law of reduction of radiation intensity with distance and to radiation scattering due to atmospheric haze. The bandwidth of the spectrum of radiation passed by the second filter 23 is chosen to be substantially equal to the bandwidth of the spectrum of radiation passed by the first filter 21. Additionally, these spectral bands of radiation are chosen to lie relatively close to each other in the wavelength spectrum so that substantially equal quantities of energy are radiated by the infra-red source within each chosen spectral band. Accordingly, the pass band for the second filter preferably is chosen to be from 1.8 to 1.9 microns. Within these wavelength limits (i.e. 1.8 to 1.9 microns) there is not only the reduction in radiation intensity due to the factors mentioned above (inverse square law reduction, radiation scattering due to haze, etc.), but also there is a further reduction in radiation intensity due to strong absorption of radiation having these wavelengths by atmospheric water vapor.

The system operation is substantially as follows. The filter disk 19 is suitably positioned between the aperture 15 and the cell 17 by a support member 29 and is rotated past the aperture 15 at some predetermined rate. The means by which the disk is rotated preferably includes a drive motor 31, a gear reduction box 33, and a gear drive arrangement 35. As the disk 19 rotates about its axis the adjacent filter sections 21 and 23 alternately pass by the mirror aperture and selectively transmit the source radiation to impinge on the infra-red sensitive cell 17. When filter section 21 is disposed in the path of the infra-red radiation a first quantity of radiant energy (that which passes through the atmospheric window) impinges on the cell 17 and causes a signal of a first amplitude to be developed thereby. An instant of time later filter section 23 is interposed in the path of the infrared radiation and a second quantity of energy impinges on the cell causing a signal having a different amplitude to be developed by the cell. This second quantity of energy transmitted to the cell 17 is that which lies in the water vapor absorption band (extending from 1.8 to 1.9 microns) and is less than said first quantity by an amount proportional to the amount of atmospheric water vapor between the infra-red source and the reference point.

The output signal thus derived from the cell 17 comprises a signal having an A.-C. component caused by the rapid variation between the two amplitude limits. These limits are determined by the relative quantities of energy selectively transmitted by filters 21 and 23 to the infra-red cell. Since the difference in the quantities of radiation passed by the two filters 21 and 23 is determined by the amount of water vapor through which the radiation passes, it will be seen that the A.-C. component of the rapidly varying signal is a function of distance. This A.-C. component may then be capacitively coupled to an amplifier 37 and thence to an indicator device 39 such as a voltmeter for providing an indication of such distance.

In the event that the density of the atmospheric water vapor changes from a known value, for which value the apparatus initially is set up or calibrated, it is apparent that there will be a different amount of energy absorption in the water vapor absorption band than expected. The A.-C. output signal (the range signal) then may have an amplitude either too great or too small for the actual range of the thermal source and hence provide an erroneous range indication. Particularly this is true if the ranging system is airborne since the density of atmospheric water vapor varies with variation in altitude. To compensate for such variations a relative humidity responder 41 and a temperature responder 43 is provided for controling the gain of the amplifier 37 such that changes in water vapor density are translated into suitable changes in amplifier bias. Thus the amplifier sensitivity is controlled as a function of the density of water vapor. The temperature responder 43 may comprise a thermometric device such as a bi-metallic element which may be connected to the relative humidity responder 41, a hair-type hygrometer, for example, for controlling the position of a potentiometer arm for controlling the bias of the amplifier 37.

Although the above example has been directed to range determination by means of the differential absorption of different wave lengths of infra-red energy transmitted through the atmosphere, it is emphasized that the invention is not limited to utilization of a filter which selectively receives and transmits energy lying in a water vapor absorption band. Carbon dioxide or ozone absorption bands may be utilized with equal facility. By way of example, one of the above filter sections can be selected to pass source signals having wavelengths between 2.02 and 2.09 microns. This filter section then passes energy which is subject to absorption by atmospheric carbon dioxide. The adjacent band pass filter may then be selected to lie in the atmospheric window from 2.12 to 2.19 microns. Thus an A.-C. range signal may be derived substantially as described above wherein water vapor was used as the absorbent. The use of atmospheric carbon dioxide as the absorbent may be particularly desirable in airborne systems for high altitude ranging since water vapor is practically non-existent above 30,000 feet. In the event that the carbon dioxide absorptive band is utilized and suitable filters are employed in connection therewith, compensation may be made for sensitivity of the amplifier 37 due to changes in the temperature and pressure of the carbon dioxide by replacing the relative humidity responder 41 with a pressure responder. The pressure responder may comprise an aneroid barometer movement and the temperature responder again may comprise a bi-metallic or other type of thermometric device, each of which may be arranged to control the amplifier sensitivity through proper change in bias.

While the apparatus described above has been described as utilizing a filter disk which mechanically is rotated such that different frequency bands of signals radiated by an infra-red source alternately are utilized, it is pointed out that such a mechanical arrangement, while simple and desirable, is not essential. Ranging also may be determined in accordance with the teachings of the invention by using electrical switching of matched cells or other means. While the invention primarily has been described as operating in the infra-red region it is further pointed out that the invention may be utilized in connection with radiations having other spectral ranges such as the visible or ultra violet spectrum or microwave wavelengths.

What is claimed is:

1. Apparatus for determining the range of a single source of infra-red radiation with respect to a point comprising, at said point, means for selectively receiving different wavelength bands of differently attenuated energy radiated by said source, and means for comparing the relative received intensities of said differently attenuated different wavelength bands to produce a signal indicative of said range.

2. Apparatus for determining the range of a source of infra-red radiation with respect to a point comprising, at said point, means for selectively receiving different wavelength bands of differently attenuated energy radiated by said source, means for combining said selectively received energy of said differently attenuated wavelength bands, and means coupled to said combining means for deriving a signal indicative of said range.

3. Apparatus for determining the range of a source of infra-red radiation with respect to a point comprising, means for selectively receiving a first wavelength band of energy subject to a given amount of atmospheric absorption in propagation from said source to said point, means for selectively receiving a second wavelength band of energy subject to atmospheric absorption an amount different from said given amount, means for effectively comparing the received intensities of said first and second wavelength bands of energy, and means for deriving a signal from said comparison indicative of said range.

4. Apparatus according to claim 2 wherein said selective signal receiving means comprise different band pass filters.

5. Apparatus according to claim 4 wherein the bandwidths of said different filters are substantially equal.

6. Apparatus for determining the range of a radiation source with respect to a point comprising, at said point, selectively receiving a first wavelength band of energy subject to a given amount of atmospheric absorption in propagation from said source to said point, means for selectively receiving a second wavelength band of energy subject to atmospheric absorption an amount different from said given amount, means for comparing the relative received intensities of said first and second wavelength energy bands, means for deriving a signal from said comparison having an amplitude which rapidly varies between limits established by the relative absorption of said selectively received energy bands, and indicator means responsive to said rapidly varying signal for indicating said range.

7. Apparatus according to claim 6 including an amplifier for amplifying said rapidly varying signal.

8. Apparatus according to claim 6 including means for controlling the sensitivity of said amplifier to compensate for changes in atmospheric temperature and pressure.

9. Apparatus for determining the range of a source of infra-red radiation with respect to a point comprising, at said point, a first narrow band band-pass filter for passing a predetermined wavelength band of energy radiated by said source and subject to a given amount of atmospheric absorption, a second narrow band band-pass filter for passing a different predetermined wavelength band of energy radiated by said source and subject to atmospheric absorption an amount different from said given amount, an infra-red sensitive cell responsive to said different bands of energy, and means coupled to said cell for deriving a signal having an amplitude which varies rapidly between limits established by the relative atmospheric absorption of said different wavelength bands of signals.

10. Apparatus as claimed in claim 9 wherein said band-pass filters comprise adjacent units which successively are disposed intermediate said cell and said source.

11. Apparatus as claimed in claim 9 including an optical system for directing said source radiation toward said infra-red sensitive cell and focusing said selectively received bands of energy thereon.

References Cited in the file of this patent

UNITED STATES PATENTS

| | | |
|---|---|---|
| 1,939,685 | Gage | Dec. 19, 1933 |
| 1,961,757 | Gage | June 5, 1934 |
| 2,264,725 | Shoupp et al. | Dec. 2, 1941 |
| 2,512,247 | Fua | June 20, 1950 |